(12) United States Patent
Song et al.

(10) Patent No.: US 11,177,943 B2
(45) Date of Patent: Nov. 16, 2021

(54) DIGITAL ELECTRONIC DEVICE BASED ON DUAL BLOCKCHAIN HAVING VIRTUAL BLOCKCHAIN AND OPERATION METHOD THEREOF

(71) Applicant: PUSHPULL SYSTEM Co., Ltd., Sejong-si (KR)

(72) Inventors: SungMyun Song, Sejong-si (KR); SangZee Lee, Daejeon-si (KR); JinHa Park, Daejeon-si (KR)

(73) Assignee: PUSHPULL SYSTEM CO., LTD., Sejong-si (KR)

( * ) Notice: Subject to any disclaimer, the term of this patent is extended or adjusted under 35 U.S.C. 154(b) by 218 days.

(21) Appl. No.: 16/695,923

(22) Filed: Nov. 26, 2019

(65) Prior Publication Data

US 2020/0186329 A1 Jun. 11, 2020

(30) Foreign Application Priority Data

Dec. 6, 2018 (KR) .................. 10-2018-0156077
Jan. 30, 2019 (KR) .................. 10-2019-0011744

(51) Int. Cl.
*H04L 29/06* (2006.01)
*H04L 9/06* (2006.01)
(Continued)

(52) U.S. Cl.
CPC .......... *H04L 9/0643* (2013.01); *G06F 9/466* (2013.01); *H04L 9/30* (2013.01); *H04L 9/3213* (2013.01); *H04W 4/80* (2018.02); *H04L 2209/38* (2013.01)

(58) Field of Classification Search
CPC .............. H04L 9/0643; H04L 2209/80; H04L 2209/805; H04L 9/3226; H04L 9/0825;
(Continued)

(56) References Cited

U.S. PATENT DOCUMENTS 9,849,364 B2 * 12/2017 Tran ..................... A63B 69/36
10,643,288 B2 * 5/2020 Orsini .................... H04L 63/12
(Continued)

FOREIGN PATENT DOCUMENTS

KR      10-1138924 B1      5/2012
KR      10-1242122 B1      3/2013
WO   WO-2019180733 A1 *   9/2019   .......... H04L 9/3247

*Primary Examiner* — Harunur Rashid
(74) *Attorney, Agent, or Firm* — Rabin & Berdo, P.C.

(57) ABSTRACT

A digital electronic device, which performs authentication using a blockchain, includes: a physical node that is connected to a physical blockchain network and a virtual blockchain network constructed in the digital electronic device, and has attribute information including pubic key information, private key information, a unique identifier (ID), and a password available for encryption of a block including transaction data through the blockchain networks; at least one virtual node that is connected to the virtual blockchain network and has attribute information including pubic key information, private key information, a unique identifier (ID), and a password available for encryption of a block including transaction data through the virtual blockchain network; and a short range communication interface module configured to be able to directly communicate with a user communication device without passing through a gateway.

12 Claims, 8 Drawing Sheets

(51) Int. Cl.
*H04W 4/80* (2018.01)
*G06F 9/46* (2006.01)
*H04L 9/30* (2006.01)
*H04L 9/32* (2006.01)

(58) Field of Classification Search
CPC ............. H04L 67/1046; H04L 67/1097; H04L 2463/082; H04L 9/30; H04L 9/3213; H04L 2209/38; H04L 63/083; H04L 9/3247; H04L 9/0891; H04L 9/3239; G06F 9/466; G06F 9/4881; H04W 12/02; H04W 12/03; H04W 12/068; H04W 4/80; H04W 12/06; G07C 9/00896; G07C 2009/00412; G07C 9/00309

See application file for complete search history.

(56) References Cited

U.S. PATENT DOCUMENTS

| | | | |
|---|---|---|---|
| 2015/0379510 A1* | 12/2015 | Smith | G06Q 20/3829 |
| | | | 705/71 |
| 2016/0162897 A1* | 6/2016 | Feeney | G06Q 20/065 |
| | | | 705/71 |
| 2019/0158470 A1* | 5/2019 | Wright | G06Q 20/065 |

* cited by examiner

DIGITAL ELECTRONIC DEVICE BASED ON DUAL BLOCKCHAIN HAVING VIRTUAL BLOCKCHAIN AND OPERATION METHOD THEREOF

BACKGROUND

1. Technical Field

The present disclosure relates to a digital electronic device based on a dual blockchain having a virtual blockchain and an operation method thereof, and more particularly, to a digital electronic device based on a dual blockchain having a virtual blockchain and an operation method thereof, by which it is possible to fundamentally solve communication security and hacking problems through an effective encryption and anti-forgery system based on a distributed blockchain in which a plurality of digital electronic devices are connected through a network such as the Internet, and it is also possible to more efficiently and reliably implement a security system that provides services quickly and safely by performing multi-authentication in connection with a virtual blockchain constructed in each digital electronic device, even in a disconnection state of the network such as the Internet.

2. Related Art

In general, a doorlock device, which is one of digital electronic devices, will be described as an example. Among doorlock devices, non-contact doorlock devices to which new functions are applied have been developed due to the popularization of smart phones.

The doorlock device using the smart phone is configured to operate its own door opening and closing device by using short range communication or commercial wireless communication.

A control method of a doorlock control system disclosed in Korean Patent No. 10-1138924 is configured to receive input information corresponding to a key button operation, perform authentication using authentication information stored in advance to generate authentication result information, and transmit the result information to a registered doorlock control terminal through a communication message, and a person coming in and out opens and closes a doorlock device according to a control command included in the message.

Furthermore, in a doorlock device using a smart phone and a control method thereof disclosed in Korean Patent No. 10-1242122, when a person coming in and out inputs a password of a doorlock, a control unit checks whether there is an error in the password through authentication, enables re-input of a password when the error is slight, transmits a captured image and doorlock status information to a smart phone when the error is large, and enters a security state in which a lock state is not released even through a lock release password is inputted.

The related arts described above determine whether to open and close a door by transmitting the authentication result of the password of the doorlock device by using the smart phone.

Meanwhile, in the case of using a network, the related smart doorlock system includes a server connected to a doorlock, is controlled by communicating with a user terminal through a TCP/IP protocol, and determines whether an outsider has trespassed based on data transmitted from a sensor, but data transmitted/received in all these processes is vulnerable to forgery and hacking.

Of course, the authentication or non-authentication of a user and data security have been performed using some encryption technologies or software in the related art. However, since the encryption method is relatively weak or simple and depends on specific software, there are limitations in the intact preservation of data and determination regarding the authentication or non-authentication of a user.

SUMMARY

Various embodiments are directed to providing a digital electronic device based on a dual blockchain having a virtual blockchain and an operation method thereof, by which it is possible to fundamentally solve communication security and hacking problems through a very high-level encryption and anti-forgery system by constructing a multi-authentication system through a remote authentication mode in which nodes of a digital electronic device are connected to perform remote authentication and a self-authentication mode based on authentication of a virtual blockchain included in the digital electronic device itself.

Also, various embodiments are directed to providing a digital electronic device based on a dual blockchain having a virtual blockchain and an operation method thereof, by which it is possible to provide services quickly and safely by using a virtual blockchain implemented in each digital electronic device and to reliably prevent hacking using short range communication such as Bluetooth in a situation including a state in which online over normal network is blocked due to an error, breakdown, power failure and the like of an authentication server.

The problems to be solved by the present disclosure are not limited to those mentioned above and other unmentioned problems will be clearly understood by those skilled in the art from the following description.

In an embodiment, a digital electronic device, which performs authentication using a blockchain, includes: a physical node that is connected to a physical blockchain network and a virtual blockchain network constructed in the digital electronic device, and has attribute information including pubic key information, private key information, a unique identifier (ID), and a password available for encryption of a block including transaction data through the blockchain networks; at least one virtual node that is connected to the virtual blockchain network and has attribute information including pubic key information, private key information, a unique identifier (ID), and a password available for encryption of a block including transaction data through the virtual blockchain network; and a short range communication interface module configured to be able to directly communicate with a user communication device without passing through a gateway.

In another embodiment, an operation method of a digital electronic device based on a dual blockchain having a virtual blockchain includes: a step in which a query controller receives a request and a communication device token for a transaction from a blockchain network; a step in which a token validator validates the communication device token based on information available in a physical blockchain or a virtual blockchain; a step of determining whether the communication device token is successfully validated; a step in which a processor outputs an operation control signal for controlling an operation of a digital electronic device when the communication device token is successfully validated; a step of allowing a transaction based on successful validation of the communication device token; a step in which a token generator generates an updated communication device token; and a step in which a virtual node generator duplicates a virtual node and adds the duplicated virtual node to a redundancy area in the digital electronic device according to a duplication command of the processor when the validation of the communication device token fails.

In further another embodiment, an operation method of a digital electronic device based on a dual blockchain having a virtual blockchain includes: a step in which a query controller receives a request and a communication device token for a transaction from a blockchain network; a step in which a token validator validates the communication device token based on information available in a physical blockchain or a virtual blockchain; a step of determining whether the communication device token is successfully validated; a step in which a processor outputs an operation control signal for controlling an operation of a digital electronic device when the communication device token is successfully validated; a step of allowing a transaction based on successful validation of the communication device token; a step in which a token generator generates an updated communication device token; and a step in which a virtual node generator activates a virtual node deactivated in a redundancy area in the digital electronic device according to an activation command of the processor when the validation of the communication device token fails.

In accordance with a digital electronic device based on a dual blockchain having a virtual blockchain and an operation method thereof according to the present disclosure, by constructing a multi-authentication system in which a blockchain connected between digital electronic devices is connected with a virtual blockchain of a digital electronic device itself, it is possible to implement very high-level communication security and hacking security.

Furthermore, the present disclosure has an effect that it is also possible to reliably prevent hacking using short range communication such as Bluetooth in a state in which online is blocked due to an error, breakdown, power failure and the like of an authentication server.

The effect of the present disclosure is not limited to that mentioned above and other unmentioned problems will be clearly understood by those skilled in the art from the following description.

DETAILED DESCRIPTION

Figure 1:
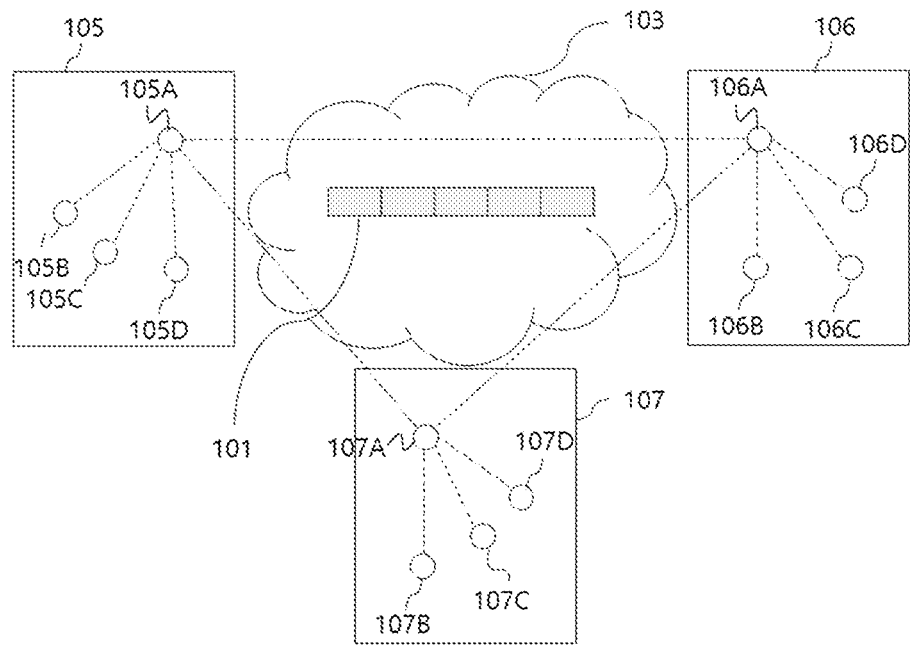
FIG. 1 is a configuration diagram of an access control system in a blockchain based smart doorlock according to an embodiment.

Additional objects, features, and advantages of the present disclosure will be understood more clearly from the following detailed description and the accompanying drawings.

Prior to the detailed description of the present disclosure, the present disclosure may be variously modified and may have various embodiments, and it should be understood that examples to be described below and illustrated in the drawings is not intended to limit the present disclosure to specific embodiments and include all modifications, equivalents, and substitutes included in the spirit and technical range of the present disclosure.

It will be understood that when an element is referred to as being "connected" or "coupled" to another element, it can be directly connected or coupled to the other element or intervening elements may be present therebetween. In contrast, when an element is referred to as being "directly connected" or "directly coupled" to another element, there are no intervening elements therebetween.

The terminology used herein is for the purpose of describing particular embodiments only and is not intended to limit the disclosure. As used herein, the singular forms "a", "an" and "the" include the plural forms as well, unless the context clearly indicates otherwise. It will be further understood that the terms "comprises", "comprising,", "includes" and/or "including", when used herein, specify the presence of stated features, numbers, steps, operations, elements, components, or combinations thereof, but do not preclude the presence or addition of one or more other features, numbers, steps, operations, elements, components, or combinations thereof.

Furthermore, a term such as " . . . section", " . . . unit", and " . . . module" described in this specification means a unit for processing at least one function or operation, and this may be implemented with hardware, software, or a combination of the hardware and the software.

Furthermore, in the following description with reference to the accompanying drawings, the same reference numerals are given to the same components and a redundant description thereof will be omitted. Detailed descriptions related to well-known functions or configurations will be ruled out in order not to unnecessarily obscure subject matters of the present disclosure.

Hereinafter, an operation method of a digital electronic device based on a dual blockchain having a virtual blockchain and a digital electronic device system according to a preferred embodiment of the present disclosure will be described in detail with reference to the accompanying drawings.

A digital electronic device according to the present disclosure may be a smart doorlock, a CCTV, a refrigerator and the like but is not limited thereto. On the other hand, in an embodiment of the present disclosure, the applicability to a smart doorlock will be described.

First, a blockchain applied to the present disclosure will be described. The blockchain described in the present disclosure refers to a method in which data information transferred online is connected through blocks and is distributed to and stored in digital electronic devices of peers, other than a central management server, in a p2p network distributed environment, so that the data information is jointly managed.

A physical blockchain based digital electronic device node (PBDN) (hereinafter, referred to a 'physical node') applied to the present disclosure refers to a physical digital electronic device connected through a physical wired/wireless network.

Furthermore, a physical blockchain network (PBN) applied to the present disclosure refers to a blockchain network connected between a plurality of physical nodes through a physical wired/wireless network.

Furthermore, a virtual blockchain based digital electronic device node (VBDN) (hereinafter, referred to a 'virtual node') applied to the present disclosure refers to a virtual digital electronic device implemented with software in a digital electronic device.

Furthermore, a virtual blockchain network (VBN) applied to the present disclosure refers to a blockchain network connected between a physical node and one or more virtual nodes implemented in the physical node. Accordingly, direct access between the virtual node implemented in a predetermined physical node and a physical node located outside is inherently blocked.

Furthermore, a blockchain network (BN) applied to the present disclosure should be understood as a concept encompassing the physical blockchain network (PBN) and the virtual blockchain network (VBN).

Hereinafter, a case where a digital electronic device is applied to a smart doorlock will be described.

FIG. 1 is a configuration diagram of an access control system in a blockchain based smart doorlock according to an embodiment.

A system 100 includes a plurality of nodes separated within individual smart doorlocks 105 to 107. The first smart doorlock 105 includes a physical node (PBDN) 105A, one or more virtual nodes (VBDN) 105B to 105D, and a redundancy area (not illustrated) for preliminarily implementing one or more virtual nodes within the physical node. The second smart doorlock 106 includes a physical node (PBDN) 106A, one or more virtual nodes (VBDN) 106B to 106D, and a redundancy area (not illustrated) for preliminarily implementing one or more virtual nodes within the physical node. The third smart doorlock 107 includes a physical node (PBDN) 107A, one or more virtual nodes (VBDN) 107B to 107D, and a redundancy area (not illustrated) for preliminarily implementing one or more virtual nodes within the physical node. In the redundancy area, at least one set of an access controller configured to be able to operate as the virtual node (VBDN) and a memory are disposed.

FIG. 1 illustrates three smart doorlocks; however, the present disclosure is not limited thereto and hundreds or hundreds of billions of smart doorlocks may be connected in the physical blockchain network (PBN). Three or four virtual nodes (VBDN) are illustrated in each of the smart doorlocks 105 to 107; however, the present disclosure is not limited thereto and hundreds or hundreds of billions of virtual nodes may be connected in the virtual blockchain network (VBN).

A blockchain 101 is a sequence of data blocks connected and protected using cryptographic techniques. Each block includes a block hash of an immediately previous block and transaction data for connection with a previous block. The block hash is data obtained by encrypting a block in a hash method. The transaction data includes data in which a user's behavior exists with respect to the nodes in the blockchain network.

The blockchain 101 serves as a distributed ledger managed by the blockchain network (BN). The blockchain 101 has a sequence form of blocks including transaction data generated through the blockchain network (BN). A block newly constructed based on the transaction data is added to a blockchain after consensus is achieved between nodes according to a predetermined procedure, based on any one of a token based consensus protocol, a lightweight cryptographic consensus protocol, and a variable cryptographic consensus protocol, or a combination thereof. The transaction data constituting the block may include a user communication device token, digital electronic device access request information, an operation control signal, operation result information, and the like. Meanwhile, a public key and a private key for encryption and a unique identifier (ID) and a password for access may be generated for use. For one use example, the private key (secret key) may be used to sign an electronic signature for proving that a user is himself/herself. The electronic signature is for verifying the validity of a transaction, and a node transmitting transaction data, a node that a user signs and receives with the private key, or the user may verify the signature to check the presence or absence of inappropriate forgery or falsification by using a public key of a sender.

Figure 2:
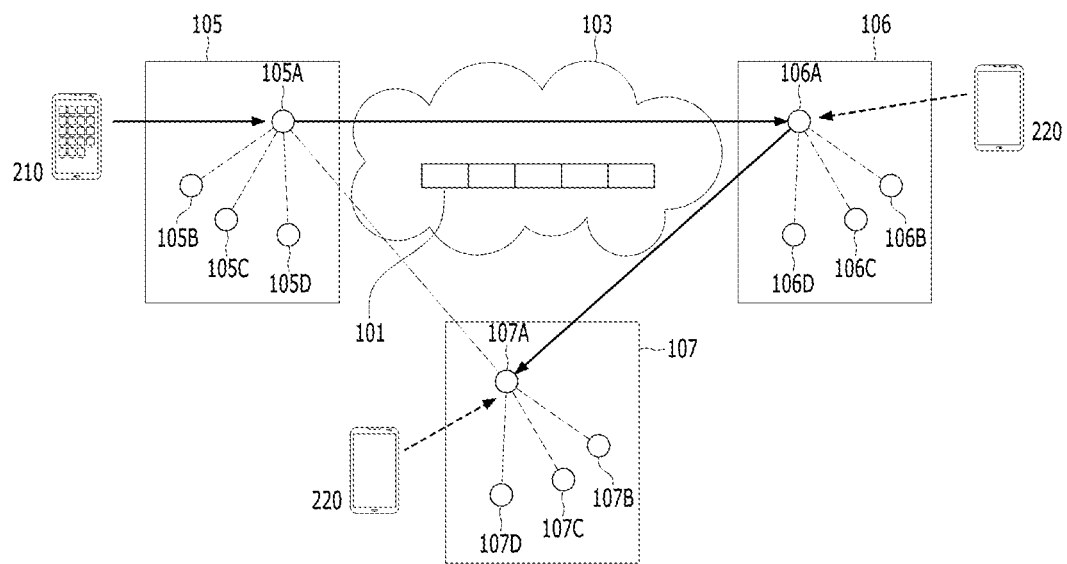
FIG. 2 is a configuration diagram of an access control system in a physical blockchain network according to an embodiment.

FIG. 2 is a configuration diagram of the access control system in the physical blockchain network according to an embodiment and illustrates a case where a physical blockchain network 103 normally operates.

When a relative visits during the absence of a homeowner who is a user (hereinafter, referred to as a "valid user") authorized according to a predetermined procedure so as to be able to access the physical node, the homeowner needs to unlock the smart doorlock at a remote location. That is, the valid user needs to access the physical node (PBDN) 105A at a remote location by using a user communication device 210. The user communication device 210 may be a cellular phone, a tablet computer, a smart watch and the like; however, the present disclosure is not limited thereto.

The user communication device 210 transmits an access request message and a communication device token to the physical node 105A for a transaction. The communication device token is dynamically allocated based on the sequence of transaction blocks in the blockchain 101.

The physical node 105A transmits transaction data received from the user communication device 210 to a transaction pool (not illustrated) through the physical blockchain network, and requests the physical blockchain network to authenticate the transaction data. When the transaction data is authenticated in the physical blockchain network, the transaction data is included in new blocks that are newly configured.

That is, a physical node (not illustrated), which is designated as a master such that the transaction pool includes the transaction data for which the authentication has been requested, configures new blocks and distributes the new blocks to the physical nodes 106A and 107A, and the physical nodes 106A and 107A having received the new blocks verify the new blocks according to a predetermined procedure in order to determine whether to authenticate the new blocks based on available information in the blockchain 101.

The physical nodes 106A and 107A return a verification result for the new blocks to a master physical node (not illustrated), the master physical node (not illustrated) collects the returned verification result, and the consensus new blocks are added to an existing blockchain stored in physical nodes and updated and stored.

When the authentication succeeds as a result of the consensus on a new block including corresponding transaction data, the physical node 105A having requested the authentication outputs an unlock control signal to a door opening and closing unit (not illustrated) to unlock the smart doorlock based on the successful authentication.

The physical node (PBDN) 105A updates the communication device token of the user communication device 210.

In accordance with an embodiment of the present disclosure, any one of a plurality of physical nodes is randomly set as the master physical node.

Hereinafter, the distribution, authentication, authentication result collection, and update of the communication device token will be referred to as consensus.

The consensus is determined based on a token based consensus protocol, a lightweight cryptographic consensus protocol, or a variable cryptographic consensus protocol, or a combination thereof. The updated communication device token is stored in the physical nodes (PBDN) 105A to 107A.

The communication device token may be any data object used to authorize access to any physical node (PBDN). The communication device token may be stored in a storage of an individual node in the blockchain network (BN). The communication device token is a unique token specialized for any node in the blockchain network. The communication device token may include a plurality of attributes. The plurality of attributes may be any one of a unique ID of an individual node, a unique ID representing a transaction, and a unique ID of the communication device token, or a combination thereof.

Meanwhile, when an invalid user accesses the physical nodes 106A and 107A at a remote location by using a user communication device 220, a transaction is denied according to determination based on a token based consensus protocol, a lightweight cryptographic consensus protocol, or a variable cryptographic consensus protocol, or a combination thereof.

Furthermore, the physical nodes 105A to 107A periodically check a connection state of the physical blockchain network (PBN). When the physical node 105A is disconnected from the whole or a part of the physical blockchain network or recognizes a situation in which the physical blockchain network is not able to normally operate, the physical node 105A distributes the most recently updated and stored blockchain in the physical blockchain network to the virtual nodes 105B to 105D implemented inside the physical node 105A. The virtual nodes 105B to 105D store a distributed blockchain 301 in storage spaces allocated to the virtual nodes 105B to 105D, and the physical node 105A operates as a slave node in a virtual blockchain network 303 where the physical node 105A participates as a master node.

Figure 3A:
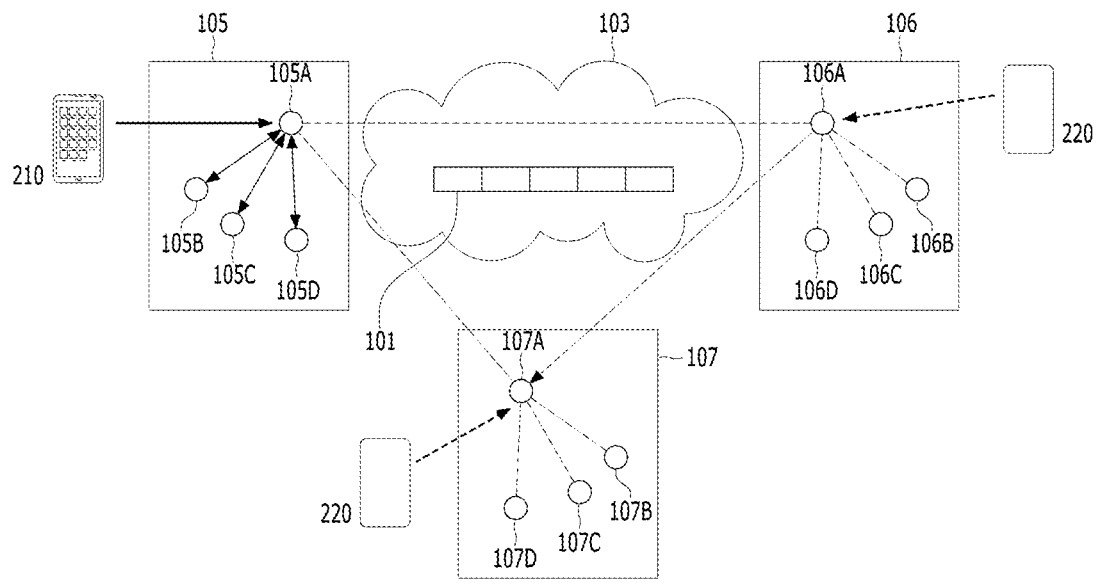
FIG. 3a is a configuration diagram of an access control system when a physical blockchain network (PBN) according to an embodiment is disconnected or is not able to normally operate.
Figure 3B:
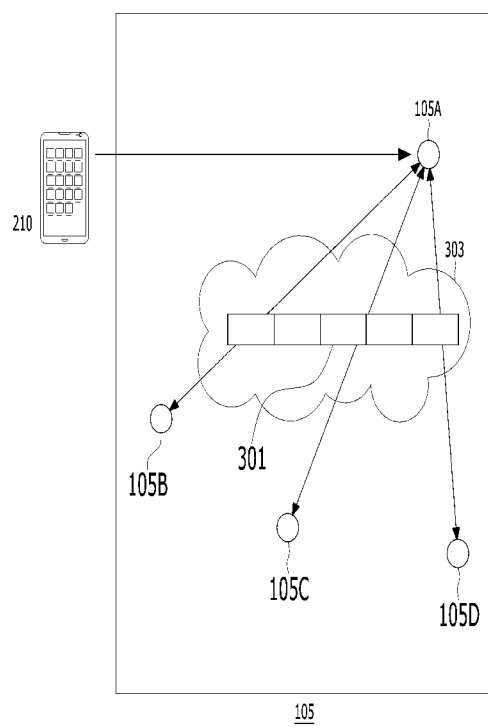
FIG. 3b is a configuration diagram of an access control system in a virtual blockchain network according to an embodiment.

FIG. 3a is a configuration diagram of the access control system when the physical blockchain network (PBN) according to an embodiment is disconnected or is not able to normally operate, and FIG. 3b is a configuration diagram of the access control system in a virtual blockchain network according to an embodiment.

A valid user accesses the physical node 105A at a remote location by using the user communication device 210. The user communication device 210 may be a cellular phone, a tablet computer, a smart watch and the like; however, the present disclosure is not limited thereto.

The user communication device 210 transmits an access request message and a communication device token to the physical node 105A for a transaction. The communication device token is dynamically allocated based on the sequence of transaction blocks in the virtual blockchain 301. The physical node 105A configures new blocks including transaction data, distributes the new blocks to the virtual nodes 105B to 105D, and requests verification. The virtual nodes 105B to 105D participate in a consensus process of verifying the new blocks including the transaction data in order to determine whether to authenticate a transaction such as a request for the communication device token and opening and closing approval of the smart doorlock based on information available in the virtual blockchain 301 according to a predetermined consensus protocol procedure.

The virtual nodes 105B to 105D return an authentication result of the communication device token to the physical node 105A, and the physical node 105A collects the authentication result, outputs an unlock control signal to a door opening and closing unit (not illustrated) to unlock the smart doorlock based on the successful authentication of the communication device token, and allows a transaction.

The physical node 105A distributes a consensus new block including the transaction and an updated communication device token to the virtual nodes 105B to 105D, and the new block is additionally connected to the existing blockchain 301 for each virtual node and updated and stored.

Furthermore, the physical node 105A updates the communication device token of the user communication device 210.

The transaction and the updated communication device token are determined based on a combination of a token based consensus protocol, a lightweight cryptographic consensus protocol, and a variable cryptographic consensus protocol.

The communication device token may be any data object used to authorize access to any physical node. The communication device token may be stored in storages of the individual virtual nodes 105B to 105D in the virtual blockchain network. The communication device token is a unique token specialized for any virtual nodes 105B to 105D in the virtual blockchain network. The communication device token may include a plurality of attributes. The plurality of attributes may be any one of unique IDs of the individual virtual nodes 105B to 105D, a unique ID representing a transaction, and a unique ID of the communication device token, or a combination thereof.

The individual virtual nodes 105B to 105D may be implemented to automatically change passwords and report the changed passwords to the physical node 105A. The change periods of the passwords may be independent of or dependent on each other. Furthermore, the change periods of the passwords may or may not be unique to each other.

In accordance with an embodiment of the present disclosure, when the physical blockchain network (PBN) is disconnected, the physical node 105A and the individual virtual nodes 105B to 105D are connected to each other in a one-to-one manner and authenticate communication device tokens. That is, even though the physical node 105A is hacked and transaction data constituting a corresponding block is abnormally changed, when it is different from transaction data of the block distributed and stored in the individual virtual nodes 105B to 105D privately implemented in the physical node 105A, the individual virtual nodes 105B to 105D transmit a result of authenticating invalid data to the physical node 105A. Based on the authentication result received from the individual virtual nodes 105B to 105D, when the majority of the virtual nodes authenticate the data as invalid data, the physical node 105A achieves consensus with unsuccessful authentication. In such a case, the physical node 105A invalidates corresponding transaction data. On the other hand, when the majority of the virtual nodes authenticate the data as valid data, the physical node 105A achieves consensus with successful authentication and validates corresponding transaction data.

When the physical blockchain network (PBN) is restored after the disconnection, inconsistency occurs between the blockchain stored in the physical node 105A and the blockchains stored in the physical nodes 106A and 107A. In such a case, the physical node 105A requests authentication by distributing, to the physical nodes 106A and 107A, some or all of transactions in the blockchain generated through the virtual blockchain network during the disconnection of the physical blockchain network. When the authentication is successful by the physical nodes 106A and 107A, the physical node 105A updates the transactions. The physical node 105A distributes the updated transactions to the physical nodes 106A and 107A.

Figure 4:
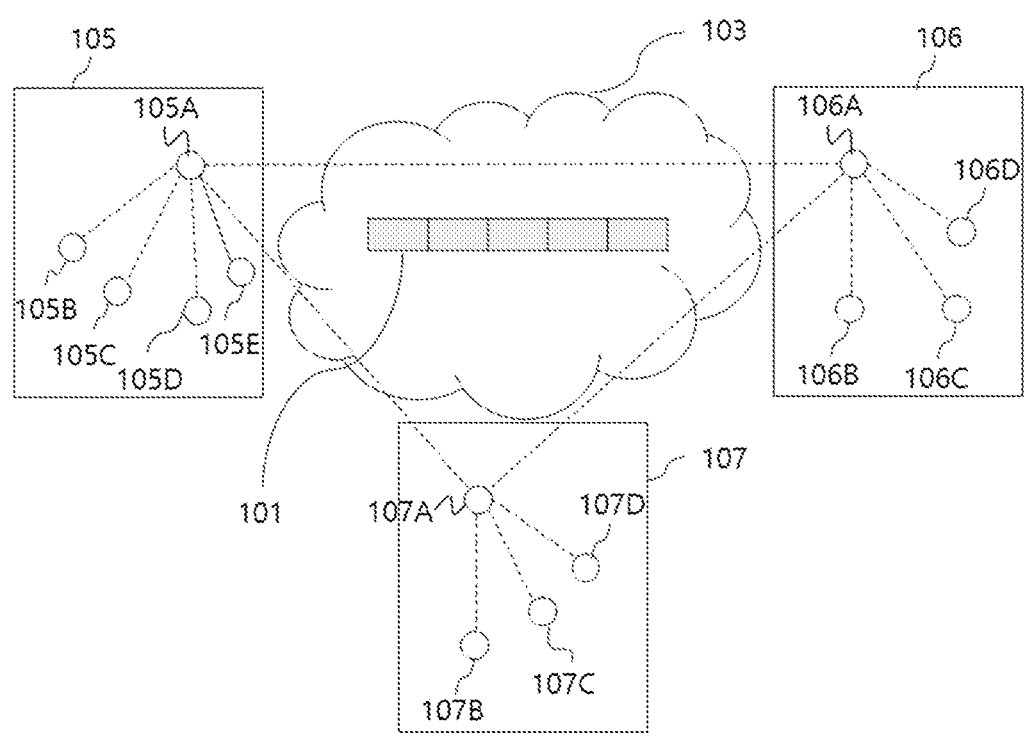
FIG. 4 is a configuration diagram of an access control system to which a virtual node according to an embodiment is added.

In accordance with an embodiment of the present disclosure, when the physical node recognizes faults such as Byzantine faults through the physical blockchain network (PBN), the physical node may additionally generate at least one virtual node in an internal redundancy area. Furthermore, in accordance with another embodiment of the present disclosure, the physical node may additionally generate virtual nodes corresponding to twice, three times, or a square number in an internal redundancy area. Furthermore, in accordance with further another embodiment of the present disclosure, the physical node may additionally generate at least one virtual node in an internal redundancy area whenever recognizing faults such as Byzantine faults through the physical blockchain network (PBN). FIG. 4 is a state diagram in which a virtual node 105E is additionally generated in the smart doorlock 105 and connected to the virtual blockchain network. Accordingly, it is possible to improve the security of the smart doorlock.

Meanwhile, in accordance with an embodiment of the present disclosure, the physical blockchain network and the virtual blockchain network may be operated independently of or in cooperation with each other.

Figure 5:
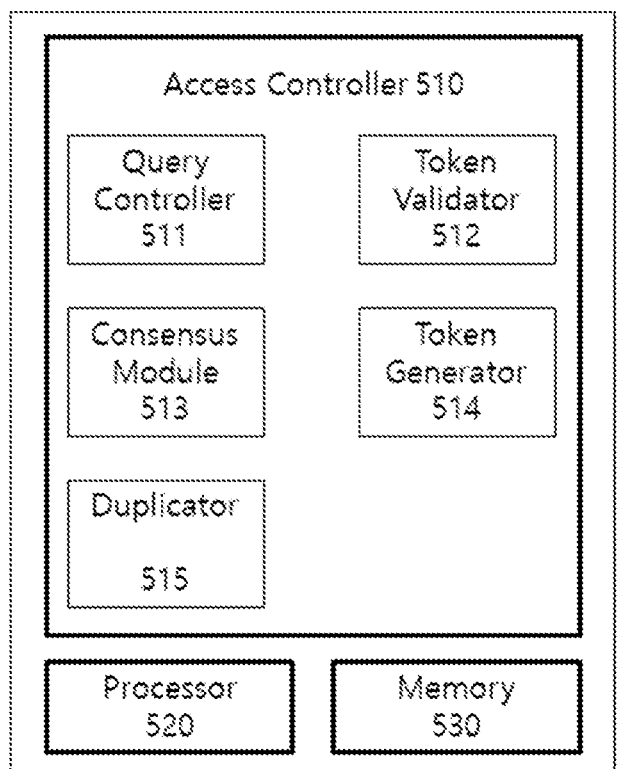
FIG. 5 is a block diagram of a physical node according to an embodiment.

FIG. 5 is a block diagram of the physical node in accordance with an embodiment of the present disclosure.

Each of the physical nodes 105A to 107A in accordance with an embodiment of the present disclosure includes an access controller 510, a processor 520, and a memory 530. The access controller 510 includes a query controller 511, a token validator 512, a consensus module 513, a token generator 514, and a virtual node generator (duplicator) 515.

The user communication device 210 may be directly connected to the smart doorlock 105 through a short range communication interface module between devices such as Bluetooth, Zigbee, RFID, WiFi direct, and NFC, or may be indirectly connected to the smart doorlock 105 via a gateway through a short range Internet communication interface module such as WiFi. That is, in accordance with the present disclosure, the short range communication interface module, for example, indicates an interface module through which the user communication device and the smart doorlock may be directly connected to each other, and the short range Internet communication interface module, for example, indicates an interface module in which the gateway is disposed between the user communication device and the smart doorlock so that the user communication device and the smart doorlock may be indirectly connected to each other.

The access controller 510 receives an access request and a communication device token from a mobile communication device for a transaction. The communication device token is validated based on information available in the physical blockchain 101 or the virtual blockchain 301.

For example, since the validation is performed based on a public key, among a private key included in initial authentication information (initially mounted authentication information), a private key and public key newly generated (in cardinal notation, a second private key and a second public key), and password change history, the second public key may be signed with an initial private key and the password change history to update the communication device token.

As described above, the validation may be performed periodically or aperiodically by signing an $N+1^{th}$ public key with an N private key and password change history according to a preset rule.

When the validity of the communication device token is successfully verified, the processor 520 outputs an unlock control signal to a door opening and closing unit (not illustrated) to unlock the smart doorlock, and allows a transaction.

The processor 520 may be a CPU, a microprocessor, or a microcontroller; however, the present disclosure is not limited thereto. The processor 520 is coupled to the memory 530 and the access controller 510. The processor 520 processes a series of commands stored in the memory 530. Any updated communication device token is stored in the memory 530.

The query controller 511 receives a request for a transaction from the blockchain network. The query controller 511 may be a processing unit that receives or generates a query belonging to the transaction request through the blockchain network. For example, the query controller 511 receives an access request and a communication device token from a mobile communication device. The communication device token is validated by the token validator 512 based on information available in the physical blockchain 101 or the virtual blockchain 301. When the validity is successfully verified, the access controller 510 allows a transaction belonging to the request to be generated.

The consensus module 513 uses any one of a token based consensus protocol, a lightweight cryptographic consensus protocol, and a variable cryptographic consensus protocol, or a combination thereof. When consensus is achieved, the transaction and the updated communication device token are added to the blockchains 101 and 301. As a consequence, the updated communication device token is stored in the mobile communication device and the memory 530.

The token generator 514 generates an updated communication device token associated with another node. The access controller 510 dynamically updates the communication device token of the mobile communication device. The associated transaction and the updated communication device token are broadcasted to the individual nodes in the blockchain network.

When the communication device token is not successfully validated by the token validator 512, the processor 520 transmits a duplication command to the duplicator 515 to generate a virtual node in an internal redundancy area and the duplicator 515 duplicates the virtual node and adds the duplicated virtual node to the internal redundancy area. Furthermore, in accordance with another embodiment of the present disclosure, at least one potential virtual node may be disposed in the internal redundancy area and the duplicator 515 may activate and add the potential virtual node.

In the present disclosure, the individual nodes 105A to 105D, 106A to 106D, and 107A to 107D may implement a blockchain, maintain the latest version of information distributed and stored in each individual node, and share the information.

As described above, each physical node of the individual nodes may be implemented in the form of a terminal; however, the present disclosure is not limited thereto and each physical node may be implemented in the form of a server operated by a specific company.

Among the physical nodes, the node implemented in the form of the terminal may store information shared on the blockchain in a secure area of a memory and the node implemented in the form of the server may store information shared on the blockchain in a secure area of a database.

That is, the present disclosure may be configured based on various types of blockchains such as a physical blockchain in which individual nodes are composed of only terminals, a physical blockchain in which individual nodes are composed of only servers, a physical blockchain in which individual nodes are composed of a mixture of terminals and servers, and a blockchain in which individual nodes are composed of a mixture of virtual blockchains and physical blockchains.

Figure 6:
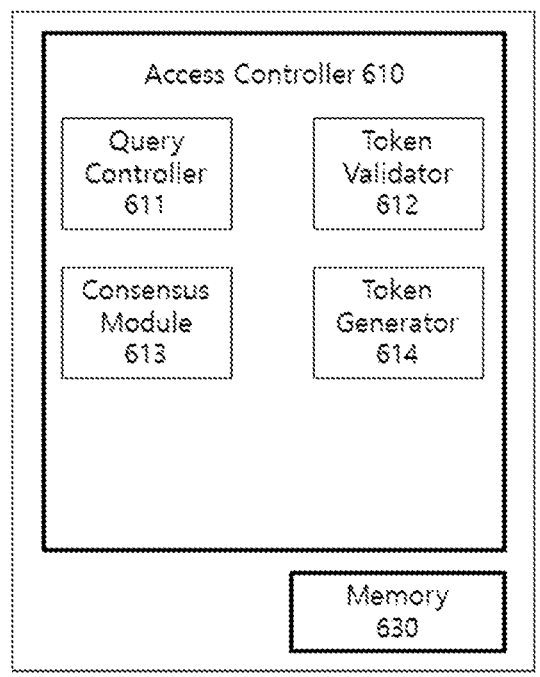
FIG. 6 is a block diagram of a virtual node according to an embodiment.

FIG. 6 is a block diagram of the virtual node in accordance with an embodiment of the present disclosure.

Each of the virtual nodes 105B to 105D, 106B to 106D, and 107B to 107D in accordance with an embodiment of the present disclosure includes an access controller 610 and a memory 630. The access controller 610 includes a query controller 611, a token validator 612, a consensus module 613, and a token generator 614, and may be implemented by predetermined software. In accordance with an embodiment of the present disclosure, the memory 630 in the virtual node may use a predetermined place in the memory 530 in the physical node or may be disposed separately.

The virtual node in accordance with an embodiment of the present disclosure may share the processor in the physical node directly connected on the blockchain network. Furthermore, the virtual node in accordance with another embodiment of the present disclosure may use a processor (not illustrated) dedicated for the virtual node.

The access controller 610 receives an access request and a physical node (105A) token from the physical node 105A for a transaction. The physical node (105A) token is validated based on information available in the virtual blockchain 301.

When the validity of the physical node (105A) token is successfully verified, the processor 520 outputs an unlock control signal to a door opening and closing unit (not illustrated) to unlock the smart doorlock, and allows a transaction.

The query controller 611 receives a request for a transaction from the blockchain network. The query controller 611 may be a processing unit that receives or generates a query belonging to the transaction request through the blockchain network. For example, the query controller 611 receives an access request and a virtual node token from the physical node 105A. The virtual node token is validated by the token validator 612 based on information available in the virtual blockchain 301. That is, the token validator 612 validates the virtual node token based on information such as whether the virtual node is a node registered in the physical node 105A and a user ID and a password PW registered in an application mounted in the user communication device 210. That is, when the virtual node is a node that is not recorded in the physical node in the smart doorlock to which the virtual node belongs or it is not matched with the user ID or the password PW recorded in the application mounted in the user communication device 210, the token validator 612 determines the virtual node as a hacked node.

When the validity is successfully verified, the access controller 610 allows a transaction belonging to the request to be generated.

The consensus module 613 uses any one of a token based consensus protocol, a lightweight cryptographic consensus protocol, and a variable cryptographic consensus protocol, or a combination thereof. When consensus is achieved, the transaction and the updated virtual node token are added to the blockchain 301. As a consequence, the updated virtual node token is stored in the physical node 105A and the memory 630.

The token generator 614 generates an updated virtual node token associated with another node. The access controller 610 dynamically updates the virtual node token of the physical node 105A. The associated transaction and the updated virtual node token are broadcasted to the individual nodes in the blockchain network.

When the virtual node token is not successfully validated by the token validator 612, the processor 520 in the physical node 105A transmits a duplication command to the duplicator 515 to generate a virtual node in the internal redundancy area and the duplicator 515 may duplicate the virtual node and add the duplicated virtual node to the internal redundancy area. Furthermore, in accordance with another embodiment of the present disclosure, at least one potential (inactive) virtual node may be disposed in the internal redundancy area and the duplicator 515 may activate and add the potential virtual node.

The processor 520 in the physical node is coupled to the memory 630 and the access controller 610 in the directly connected virtual node and processes a series of commands stored in the memory 630. Any updated virtual node token is stored in the memory 630.

As described above, when the Internet is disconnected, the present disclosure independently serves as the blockchain based smart doorlock by utilizing a multi-blockchain function implemented between the physical node and the plurality of virtual nodes connected to a virtual blockchain network constructed in the physical node, and performs the blockchain function by itself to quickly verify the validity of a transaction, thereby further enhancing an anti-hacking function.

As described above, when a transaction including an opening and closing control signal for a door is received from the processor 520, the virtual blockchain based smart doorlock node having a password automatically changed is subjected to an authentication procedure by presenting each password change history. Particularly, even in a state in which wired/wireless communication is disconnected, the virtual blockchain based smart doorlock node is subjected to an authentication procedure by presenting recently generated password change history when an authentication request is made through short range communication, thereby achieving a strong security function through the implementation of a self-blockchain function.

Then, when the wired/wireless communication is restored, new public key information (physical blockchain) including the recent password change history is provided to other nodes through a wired/wireless communication network.

As described above, in the present disclosure, the blockchain network doorlock system is authenticated through the virtual blockchain connected to one or more virtual nodes even when an impure user intends to use the system, or online is blocked due to error, breakdown, power failure and the like of a server, so that a complete security system is completed. Furthermore, when the physical blockchain network normally operates, a changed public key is transmitted and shared through connection to the physical nodes.

Figure 7:
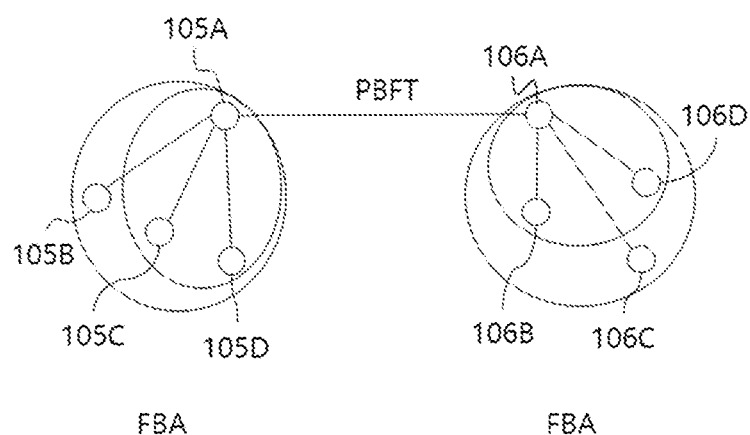
FIG. 7 is a scenario for a lightweight cryptographic consensus protocol for achieving blockchain consensus according to an embodiment.

FIG. 7 is a scenario for a lightweight cryptographic consensus protocol for achieving blockchain consensus according to an embodiment of the present disclosure.

Referring to FIG. 7, a system 700 combines federated Byzantine agreement (FBA) and partial byzantine faults tolerance (PBFT) consensus protocols as the lightweight cryptographic consensus protocol. In accordance with an embodiment, 105A to 105D form one node group and 106A to 106D form another node group. Each individual node group includes a physical node and virtual nodes in a smart doorlock. Intra-group consensus is achieved using the FBA consensus because many nodes exist in the group and highly scalable consensus is required among the nodes. On the other hand, inter-group consensus is achieved using the PBFT consensus because the number of groups is smaller than the number of nodes in the group.

In accordance with an embodiment, a consensus protocol based on variable cryptographic puzzles may be used to achieve consensus on transactions associated with the blockchains 101 and 301. In the blockchain based technology used for cryptocurrency such as Bitcoin™ or Ethererum™, a proof of work (PoW) system requires nodes to provide a proof of work for transaction blocks accepted by blockchain network peers. Regarding the blockchain network and the blockchains 101 and 301, consensus is achieved based on the proof of work of the user communication device 210. In order to validate a transaction data block, the block needs to be hashed to a value below a current target value. The current target value is based on the probability of successful block generation. The variable cryptographic puzzle is determined based on the probability of the successful block generation. When the user communication device 210 requests access to the physical node 105A, the probability is determined based on the computation power of the user communication device 210 and the physical node 105A. The probability is a function of the computation power of the physical node 105A and the memory 530. The puzzle solving time is independent of the computation power of the physical node 105A and the memory so that all nodes in the blockchain network can solve the puzzle at about the same time.

Figure 8:
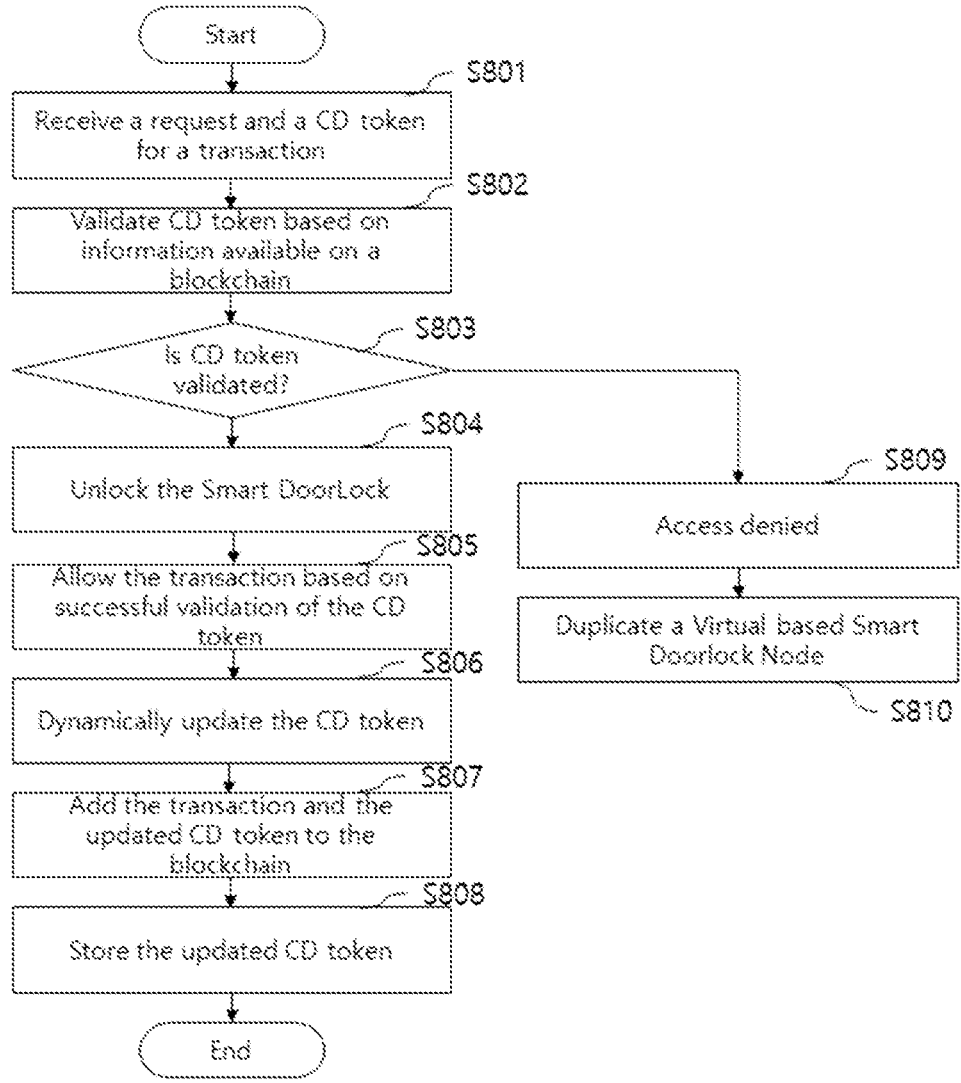
FIG. 8 is a blockchain based access control flowchart according to an embodiment.

FIG. 8 is a blockchain based access control flowchart according to an embodiment of the present disclosure.

The query controller 511 or 611 receives a request and a communication device token for a transaction from the blockchain network (S801).

The communication device token is validated by the token validators 512 and 612 based on information available in the physical blockchain 101 or the virtual blockchain 301 (S802).

It is determined whether the communication device token is successfully validated (S803), and when the communication device token is successfully validated, the processor 520 outputs an opening and closing control signal to a door opening and closing unit (not illustrated) to unlock the smart doorlock and unlocks the smart doorlock (S804).

Then, the processor 520 allows a transaction based on the successful validation of the communication device token (S805).

Then, the token generator 514 or 614 generates an updated communication device token, and the access controller 510 or 610 dynamically updates a communication device token of a mobile communication device (S806). The associated transaction and the updated communication device token are broadcasted to the individual nodes in the blockchain network.

The consensus module 513 or 613 uses any one of a token based consensus protocol, a lightweight cryptographic consensus protocol, and a variable cryptographic consensus protocol, or a combination thereof. The transaction and the updated communication device token are added to the blockchains 101 and 301 (S807).

The updated communication device token is stored in the memory 530 or 630 in the individual nodes (S808).

On the other hand, when the validation of the communication device token fails, access is denied (S809) and the duplicator 515 duplicates a virtual node VBDLN and adds the duplicated virtual node VBDLN to a redundancy area (S810).

Accordingly, the physical node and one or more virtual nodes are subjected to an authentication procedure by presenting each password change history, have a strong security function through the implementation of a virtual blockchain network even though a wired/wireless network is disconnected, transmit a mobile device token including public key information through the wired/wireless network at a predetermined time, and provide the mobile device token to other nodes, thereby implementing a distributed ledger function.

Meanwhile, the short range communication method mentioned in the description of the present disclosure may be various short range communication technologies of a personal area network (PAN) scheme, such as beacon, Bluetooth low energy (BLE), Zigbee, ultra-wideband (UWB), ANT, and WiFi, in addition to Bluetooth.

Furthermore, a user terminal mentioned in the description of the present disclosure may be an electronic device including a communication function in addition to a smart phone. For example, the electronic device may be a tablet personal computer (PC), a mobile phone, a videophone, an electronic (e)-book reader, a desktop personal computer (PC), a laptop personal computer (PC), a netbook computer, a personal digital assistant (PDA), a portable multimedia player (PMP), an MP3 player, a mobile medical device, a camera, and a wearable device (for example, a head-mounted-device (HMD) such as electronic glasses, electronic garment, electronic bracelet, electronic necklace, electronic appcessory, electronic tattoo, or smartwatch.

In a smart doorlock based on a dual blockchain having a virtual blockchain and an operation method thereof according to the present disclosure as described above, by establishing a multi-authentication system in which a blockchain associated between smart doorlocks is associated with a virtual blockchain of the smart doorlock itself, it is possible to implement very high communication security and hacking security, and to reliably prevent hacking using short range communication such as Bluetooth in a state in which online is blocked due to an error, breakdown, power failure and the like of an authentication server.

The spirit of the present disclosure can be applied to a case where a digital electronic device is a CCTV, and when a communication device token is successfully validated, a physical blockchain based CCTV processor may output an operation control signal to an operation control unit (not illustrated) to perform an operation in the CCTV. The operation performed by the CCTV may indicate a direction change, a zoom-up function, photo transmission and the like of the CCTV.

Figure 9:
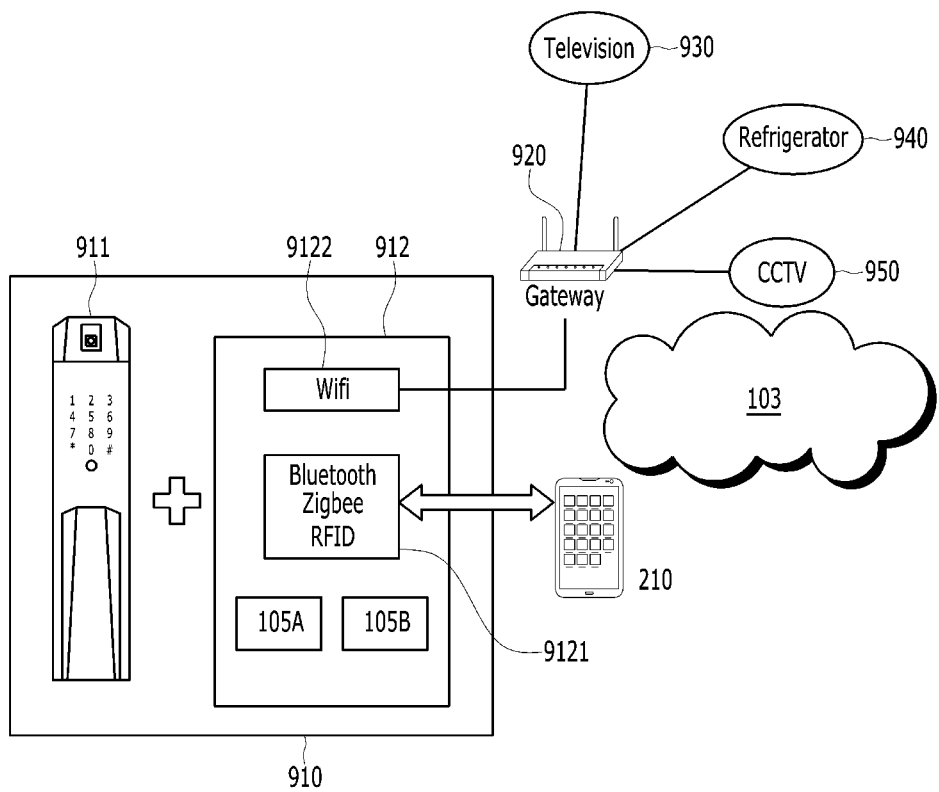
FIG. 9 is a configuration diagram of a network to which a smart doorlock according to an embodiment is applied.

FIG. 9 is a configuration diagram of a network to which a smart doorlock according to an embodiment of the present disclosure is applied.

A smart doorlock 910 according to an embodiment has a configuration in which a blockchain module 912 is added to an existing doorlock 911. The blockchain module 912 includes a LAN interface module 9121, an Internet interface module 9122, the physical node 105A, and the one or more virtual nodes 105B, . . . .

The existing doorlock 911 indicates a doorlock that is unlocked by inputting a password by a touch. The LAN interface module 9121 is a wireless communication module such as Bluetooth, Zigbee, and RFID and may directly communicate with the user communication device 210 without passing through a gateway. That is, when the user communication device 210 enters a predetermined distance near the smart doorlock 910, the smart doorlock 910 may recognize the user communication device 210 by a wireless communication method and unlock a locking device. The Internet interface module 9122 is a wired/wireless WiFi module and may access a gateway 920 disposed outside. A television 930, a refrigerator 940, a CCTV 950 and the like disposed in the house may access the gateway 920 disposed in the house as one of the Internet of Things. Each of the gateway 920, the television 930, the refrigerator 940, the CCTV 950 and the like disposed in the house may serve as a physical node in a physical blockchain network.

Figure 10:
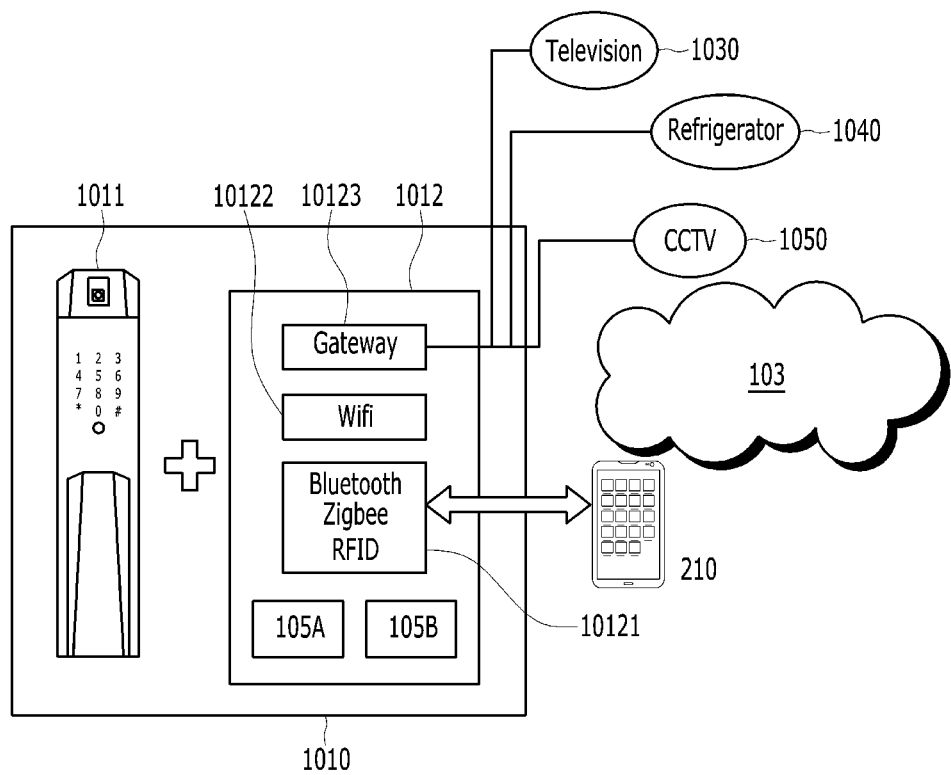
FIG. 10 is a configuration diagram of a network to which a smart doorlock according to another embodiment is applied.

FIG. 10 is a configuration diagram of a network to which a smart doorlock according to another embodiment of the present disclosure is applied.

A smart doorlock 1010 according to an embodiment has a configuration in which a blockchain module 1012 is added to an existing doorlock 1011. The blockchain module 1012 includes a LAN interface module 10121, an Internet interface module 10122, a gateway 10123, the physical node 105A, and the one or more virtual nodes 105B, . . . .

The existing doorlock 1011 indicates a doorlock that is unlocked by inputting a password by a touch. The LAN interface module 10121 is a wireless communication module such as Bluetooth, Zigbee, and RFID and may directly communicate with the user communication device 210. That is, when the user communication device 210 enters a predetermined distance near the smart doorlock 1010, the LAN interface module 10121 recognize the user communication device 210 by a wireless communication method. When the LAN interface module 10121 transmits a detection signal to the processor 520 in the smart doorlock 1010, the processor 520 outputs an unlock control signal to a door opening and closing unit (not illustrated). The gateway 10123 may access a television 1030, a refrigerator 1040, a CCTV 1050 and the like in the house as one of the Internet of Things by using a WiFi module of the Internet interface module 10122. Each of the gateway 10123, the television 1030, the refrigerator 1040, the CCTV 1050 and the like may serve as a physical node in a physical blockchain network.

The embodiment and the accompanying drawings described in the present specification are merely intended to describe a part of the technical spirit included in the present disclosure. Therefore, since the embodiment disclosed in the present specification is not intended to limit the technical spirit of the present disclosure but to explain the technical spirit of the present disclosure, it is obvious that the scope of the technical spirit of the present disclosure is not limited by such an embodiment. Modifications and specific embodiments easily inferred by those skilled in the art within the scope of the technical spirit included in the specification and the drawings of the present disclosure should be construed as being included in the scope of the present disclosure.

What is claimed is:

1. A digital electronic device based on a dual blockchain having a virtual blockchain, which performs authentication using a blockchain, comprising:

a physical node that is connected to a physical blockchain network and a virtual blockchain network constructed in the digital electronic device, and has attribute information including public key information, private key information, a unique identifier (ID), and a password available for encryption of a block including transaction data through the blockchain networks;

at least one virtual node that is connected to the virtual blockchain network and has attribute information including public key information, private key information, a unique identifier (ID), and a password available for encryption of a block including transaction data through the virtual blockchain network; and a short range communication interface configured to be able to directly communicate with a user communication device without passing through a gateway, wherein the physical node comprises:

a processor;

a memory; and an access controller stored in the memory to receive an access request and a communication device token for a transaction from a mobile communication device at a remote location, and wherein the access controller comprises:

a query controller configured to receive a request for a transaction from the physical blockchain network or the virtual blockchain network;

a token validator configured to validate the communication device token based on information available in the physical blockchain or the virtual blockchain;

a consensus module stored in the memory to verify validity of the communication device token by using any one of a token based consensus protocol, a lightweight cryptographic consensus protocol, and a variable cryptographic consensus protocol, or a combination thereof;

a token generator configured to generate an updated communication device token when the communication device token is successfully validated by the token validator; and a virtual node generator configured to activate a virtual blockchain based digital electronic device node deactivated in a redundancy area in the digital electronic device according to an activation command of the processor when the communication device token is not successfully validated by the token validator.

2. The digital electronic device according to claim 1, wherein, when the physical blockchain network is disconnected, the virtual node is configured to authenticate validity of a transaction between the physical node and the virtual node.

3. The digital electronic device according to claim 2, wherein the virtual node is formed in a plural number and configured to automatically change a password according to a time period set independently of or dependently on each other.

4. The digital electronic device according to claim 2, wherein the virtual node comprises:

a memory; and
an access controller stored in the memory configured to receive an access request and a physical node token for a transaction from the physical node.

5. The digital electronic device according to claim 4, wherein the memory in the virtual node is a part of a memory in the physical node.

6. The digital electronic device according to claim 4, wherein the access controller in the virtual node comprises:
   a query controller configured to receive a request for a transaction from the virtual blockchain network;
   a token validator configured to validate the physical node token based on information available in the virtual blockchain;
   a consensus module stored in the memory configured to verify validity of the physical node token by using any one of a token based consensus protocol, a lightweight cryptographic consensus protocol, and a variable cryptographic consensus protocol, or a combination thereof; and
   a token generator configured to generate an updated physical node token when the physical node token is successfully validated by the token validator.

7. The digital electronic device according to claim 1, wherein the communication device token is validated based on information available in a physical blockchain or a virtual blockchain.

8. The digital electronic device according to claim 7, wherein, when validity of the communication device token is successfully verified, the processor outputs an operation control signal to an operation control unit stored in the memory in the digital electronic device such that the digital electronic device performs a predetermined operation, and allows a transaction.

9. The digital electronic device according to claim 1, further comprising:
   a gateway configured to be able to communicate with Internet of Things (IoT) including a physical node in a house in a wired/wireless manner.

10. A digital electronic device based on a dual blockchain having a virtual blockchain, which performs authentication using a blockchain, comprising:
    a physical node that is connected to a physical blockchain network and a virtual blockchain network constructed in the digital electronic device, and has attribute information including public key information, private key information, a unique identifier (ID), and a password available for encryption of a block including transaction data through the blockchain networks;
    at least one virtual node that is connected to the virtual blockchain network and has attribute information including public key information, private key information, a unique identifier (ID), and a password available for encryption of a block including transaction data through the virtual blockchain network; and
    a short range communication interface configured to be able to directly communicate with a user communication device without passing through a gateway,
    wherein the physical node comprises:
    a processor;
    a memory; and
    an access controller stored in the memory to receive an access request and a communication device token for a transaction from a mobile communication device at a remote location,
    wherein the access controller comprises:
    a query controller configured to receive a request for a transaction from the physical blockchain network or the virtual blockchain network;
    a token validator configured to validate the communication device token based on information available in the physical blockchain or the virtual blockchain;
    a consensus module stored in the memory configured to verify validity of the communication device token by using any one of a token based consensus protocol, a lightweight cryptographic consensus protocol, and a variable cryptographic consensus protocol, or a combination thereof;
    a token generator configured to generate an updated communication device token when the communication device token is successfully validated by the token validator; and
    a virtual node generator configured to duplicate a virtual blockchain based digital electronic device node and add the duplicated virtual blockchain based digital electronic device node to a redundancy area in the digital electronic device according to a duplication command of the processor when the communication device token is not successfully validated by the token validator.

11. An operation method of a digital electronic device based on a dual blockchain having a virtual blockchain, comprising:
    a step in which a query controller receives a request and a communication device token for a transaction from a blockchain network;
    a step in which a token validator validates the communication device token based on information available in a physical blockchain or a virtual blockchain;
    a step of determining whether the communication device token is successfully validated;
    a step in which a processor outputs an operation control signal for controlling an operation of a digital electronic device when the communication device token is successfully validated;
    a step of allowing a transaction based on successful validation of the communication device token;
    a step in which a token generator generates an updated communication device token; and
    a step in which a virtual node generator duplicates a virtual node and adds the duplicated virtual node to a redundancy area in the digital electronic device according to a duplication command of the processor when the validation of the communication device token fails,
    wherein the virtual node has attribute information including public key information, private key information, a unique identifier (ID), and a password available for encryption of a block including transaction data through the blockchain network.

12. An operation method of a digital electronic device based on a dual blockchain having a virtual blockchain, comprising:
    a step in which a query controller receives a request and a communication device token for a transaction from a blockchain network;
    a step in which a token validator validates the communication device token based on information available in a physical blockchain or a virtual blockchain;
    a step of determining whether the communication device token is successfully validated;
    a step in which a processor outputs an operation control signal for controlling an operation of a digital electronic device when the communication device token is successfully validated;

a step of allowing a transaction based on successful validation of the communication device token;

a step in which a token generator generates an updated communication device token; and a step in which a virtual node generator activates a virtual node deactivated in a redundancy area in the digital electronic device according to an activation command of the processor when the validation of the communication device token fails, wherein the virtual node has attribute information including public key information, private key information, a unique identifier (ID), and a password available for encryption of a block including transaction data through the blockchain network.

* * * * *